United States Patent [19]

Dequasie

[11] Patent Number: 5,708,558
[45] Date of Patent: Jan. 13, 1998

[54] CAPACITOR HAVING DIELECTRIC MATERIAL CONTAINING CALCIUM OXIDE

[75] Inventor: Andrew E. Dequasie, Pownal, Vt.

[73] Assignee: Commonwealth Sprague Capacitor Inc., North Adams, Mass.

[21] Appl. No.: 650,760

[22] Filed: May 20, 1996

Related U.S. Application Data

[60] Provisional application No. 60/009,711, July 13, 1995.
[51] Int. Cl.$^6$ .................................................. H01G 4/32
[52] U.S. Cl. .................. 361/301.5; 361/327; 361/301.3; 361/314; 361/319; 361/315; 252/575
[58] Field of Search ........................ 361/301.1, 301.3, 361/301.5, 305, 307, 308.1, 308.2, 309, 272, 311, 312, 313, 314, 315, 318, 319, 321.3–321.5, 327; 252/567

[56] References Cited

U.S. PATENT DOCUMENTS

| | | |
|---|---|---|
| 4,317,158 | 2/1982 | Dequasie .................................. 361/272 |
| 4,317,159 | 2/1982 | Dequasie .................................. 361/318 |

*Primary Examiner*—Michael W. Phillips
*Assistant Examiner*—Anthony Dinkins

[57] ABSTRACT

A metalized film capacitor has a plurality of electrodes separated by dielectric spacers and contains a dielectric fill system including 1 to 50 wt % of calcium oxide scavenger. This dielectric fill system is especially useful in aluminum metalized film capacitors for AC service.

5 Claims, 1 Drawing Sheet

CAPACITOR HAVING DIELECTRIC MATERIAL CONTAINING CALCIUM OXIDE

This application claims the benefit of U.S. Provisional Application No. 60/009,711 filed Jul. 13, 1995.

BACKGROUND OF THE INVENTION

This invention relates to metalized film capacitors containing dielectric fill materials including scavenger quantities of calcium oxide. More particularly, this invention relates to a capacitor having a film dielectric metalized with aluminum or an aluminum alloy and filled with a dielectric material including 1 to 50 wt % of calcium oxide as a scavenger for use in AC service.

The prior art has taught the need for scavengers in a metalized capacitor so as to overcome the effects of moisture that promotes corrosion that causes capacitance loss and ultimately shortens the life of the capacitor. Our earlier work has resulted in the practice of adding isocyanates to the dielectric fluid as a water scavenger (U.S. Pat. No. 4,317,159 and U.S. Pat. No. 4,449,163) and also by gelling the dielectric fluid in a urethane system containing some unreacted isocyanate (U.S. Pat. No. 4,580,189 and GB 2,172,431A). However, isocyanates require considerable care in handling to avoid hazards to personnel. Also, the isocyanates must dissolve in the dielectric fluid in order to achieve a reasonable dispersion throughout the capacitor. This leaves the isocyante entirely free to enter the margins and other active electrode areas accessible to the dielectric fluid. Since the isocyanates tend to have a high dissipation factor, this limits the amount of isocyanate that can be used, which, in turn, limits the amount of moisture that can be scavenged.

It is an object of this invention to provide an AC capacitor utilizing a dielectric fluid with improved life characteristics and allowing higher operating voltages.

It is a further object of this invention to provide a moisture scavenger superior to the isocyanates in (1) environmental friendliness, (2) quantity of moisture that can be scavenged, (3) material cost, and (4) capacitor manufacturing cost.

SUMMARY OF THE INVENTION

In seeking a better moisture scavenger, we evaluated the oxides of aluminum, calcium, magnesium, and zinc. As a first test, we simply exposed various grades of these oxides to ambient atmospheric moisture at room temperature and found that aluminum and zinc oxides had very little weight gain compared to magnesium oxide (26.7% to 27.5%) and calcium oxide (41.6%). We then exposed the magnesium and calcium oxides to an atmosphere saturated with water vapor at room temperature and measured weight gains of 61.6% to 66.1% for magnesium oxide, 41.8% for calcium oxide.

If the calcium and magnesium oxides reacted completely with water to form the hydroxides, the amount of water consumed, relative to the original oxide weight would be 32.1% of the calcium oxide weight or 44.67% of the magnesium oxide weight. The above figures for atmospheric moisture pick-up indicate that the hydroxides must also be hygroscopic. Note also, that the isocyanate most commonly used for water scavenging, diphenyl methane diisocyanate, can react with only 14.39% of its own weight in water.

In capacitor tests with calcium oxide and magnesium oxide, we found that calcium oxide is a highly effective moisture scavenger in this application, while magnesium oxide is not. It appears that the moisture scavenging efficiency of magnesium oxide probably decreases as the ambient moisture content decreases, so that it becomes ineffective at removing traces of moisture. Calcium oxide appears not to have this limitation.

Calcium oxide is compatible with a wide variety of dielectric fluids and proves to be such an effective moisture scavenger that it will allow pour filling of capacitors under ambient conditions as compared to the more expensive and time-consuming vacuum impregntion which has been used for metalized polypropylene capacitors even though most of the active capacitor area is not accessible to fluid dielectrics. This has the added advantage of making subsequent degreasing unnecessary, eliminating costly environmental protection requirements.

We have also found that calcium oxide is compatible with a wide range of gelled dielectric systems, including urethanes, with or without free isocyanate. Our preferred systems are those in which unsaturated resins and crosslinkers are cured with a peroxide to form a gel which can entrap a dielectric liquid such as canola oil or diisononyl phthalate equal to as much as 70 wt % of the gel. The peroxide is, preferably, methyl ethyl ketone peroxide, promoted with a cobalt compound such as cobalt naphthenate.

In addition to the moisture scavenging effect of the calcium oxide added to the gel, the dielectric gel fulfills three other important needs: (1) the non-reactive dielectric fluid contained in the gel is able to migrate by capillary action into the margins of the capacitor, displacing voids there that might give rise to destructive corona, (2) the gel is soft enough to allow the operation of a circuit interrupter which mechanically disrupts one or both capacitor leads in response to over-pressure within the capacitor case, and (3) the gel is non-flowing and behaves as a dry potting for vibration damping and to minimize spillage in the event of case rupture.

Further, we believe that calcium oxide is also effective in scavenging trace amounts of chlorides, which are notoriously harmful to aluminum or zinc electrodes.

One would probably not want calcium oxide particles between the active electrodes of a capacitor. In vacuum metalized capacitors in general and vacuum metalized polypropylene capacitors in particular, the void space between the electrodes is apparantly too small to admit such particles. Since moisture is generally not desireable in any capacitor having a plastic film dielectric, we believe that calcium oxide can be a useful additive to any such capacitor, provided only that the design not allow calcium oxide particles between the active electrodes.

DESCRIPTION OF THE PREFERRED EMBODIMENTS

Capacitors Containing An Oil Slurry Fill

Figure 1:
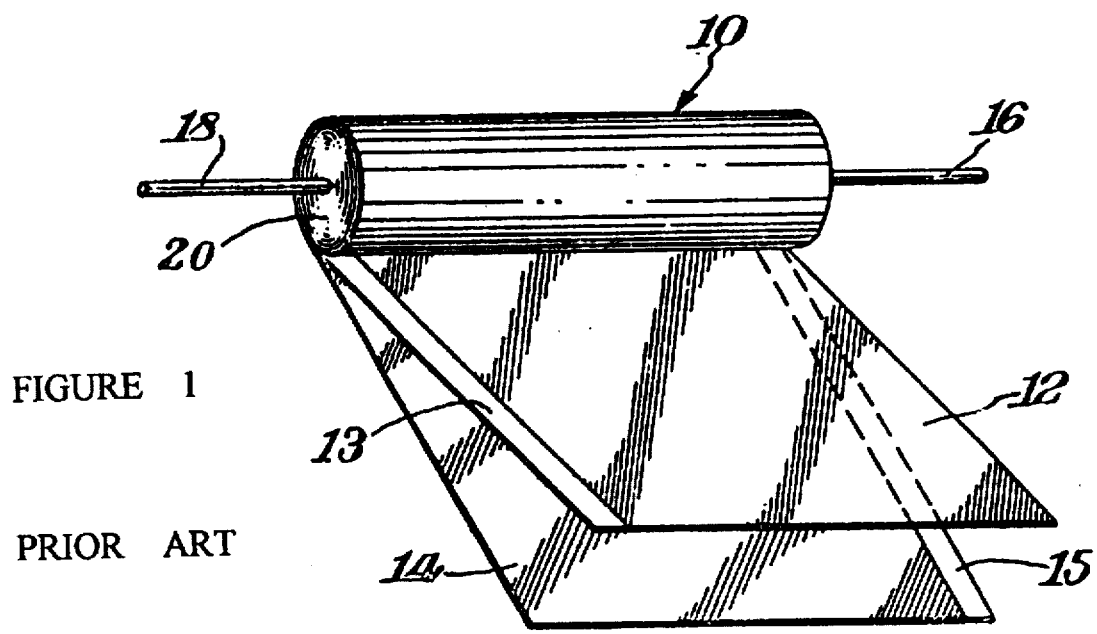
FIG. 1 depicts a partly unwound metalized capacitor section of the type in which the improved dielectric composition of this invention is employed as the surrounding fill.

Life characteristics of AC metalized film capacitors have been found to be improved through the use of a dielectric fill containing calcium oxide. A metalized film section 10 consists of two metalized film electrodes 12 and 14, e.g. polypropylene metalized with aluminum or an aluminum alloy. The electrodes 12 and 14 are provided with unmetalized margins, 13 and 15 respectively, which are oppositely positioned in the winding 10 so that the metalized portion of each electrode is available for lead contact at only one edge of the winding. The ends of the wound section 10 are covered with a metallic spray or solder 20, and tabs or leads 16 and 18 are connected thereby to electrodes 12 and 14, respectively. The section 10 is installed in a case filled with the dielectric composition of the present invention.

Each of the following examples involves groups of metalized capacitors filled under identical conditions. Metalizing consists of an aluminum-copper alloy (Al/Cu), which is highly sensitive to moisture under AC service conditions, or zinc (Zn), which is sensitive to humidity during manufacture, but relatively immune to moisture-activated corrosion in AC service. All are 25 microfarad (Mfd) capacitors made with 6-micron (0.24 mil) polypropylene film, which is normally rated at 330 to 370 volts AC. Three capacitors were filled with each dielectric fluid test mixture and the capacitance change figures shown are an average for the three units.

The phthalate ester used was diisononyl phthalate. Canola oil is a variety of rapeseed oil which has been genetically engineered to reduce the euricic acid content for food uses. It is expected that the capacitor performance of canola oil and rapeseed oil would be virtually identical, but canola oil is more commonly available in the United States. The epoxidized linseed oil shown in some examples is a commercially available grade.

The calcium oxide used is a commercial grade from one source and not further treated or processed for use in this invention.

All life tests were carried out at 492 volts, 60 Hz, 80 C., for the number of hours stated in each example. In such tests, capacitance loss tends to be greatest in the first few hundred hours as the most vulnerable areas of the capacitor metalizing are exposed to attack. The rate of capacitance change tapers off thereafter if an effective protective mechanism is operating. All test values shown are percent capacitance change from the original value.

EXAMPLE 1

In our first test of metal oxide additives, we vacuum degassed the liquid fill mixtures (about 500 micron vacuum) and pre-heated the test capacitors before simply pouring the test mixtures into the capacitors without benefit of the more rigorous vacuum impregnation. Test results after 500 hours on test were:

|  | Al/Cu | Zinc |
| --- | --- | --- |
| Canola Oil, no additive | −5.708 | +0.403 |
| Canola Oil + 10% MgO | −8.950 | −0.054 |
| Canola Oil + 10% CaO | −0.524 | +0.135 |
| Epoxidized Linseed Oil + 10% MgO | −3.811 | +0.107 |
| Phthalate Ester + 10% Isocyanate | −1.317 | −0.037 |

As had been hinted by the simple moisture weight gain tests on the oxides, moisture scavenging by magnesium oxide seems to be an equilibrium thing which lo becomes less efficient as ambient moisture concentration declines, while moisture scavenging by calcium oxide seems to be relatively independant of the ambient moisture concentration. In any event, calcium oxide was the obvious best choice among the oxides tested.

EXAMPLE 2

Another test group was prepared to test whether large amounts of calcium oxide could be used without harm to the capacitors. All mixes containing calcium oxide also contained 3% of fumed silica as a dispersant to slow or prevent the settling of the calcium oxide in the liquid. Liquid fill mix was poured into the capacitors as before without benefit of vacuum impregnation, and neither the units nor the liquid mixes were pre-heated. Results are given below after 750 hours (marked with an asterisk) or 1250 hours (no asterisk):

|  | Al/Cu | Zinc |
| --- | --- | --- |
| Phthalate Ester + 5% isocyanate | −3.005 | −1.028 |
| Phthalate Ester, no additive | −14.28* | −0.243 |
| Phthalate Ester + 30% CaO | +0.026 | +1.240 |
| Phthalate Ester + 50% CaO | −0.053 | +1.120 |
| Canola Oil, no additive | −14.24* | +0.080 |
| Canola Oil + 30% CaO | −0.500 | +0.267 |
| Canola Oil + 50% CaO | −0.422 | +0.262 |
| Epoxidized Linseed Oil, no additives | −11.69* | −0.013 |
| Epoxidized Linseed Oil, + 30% CaO | −0.671 | +0.080 |
| Epoxidized Linseed Oil, + 50% CaO | −0.603 | +0.081 |

No problems due to the large dosages of calcium oxide were encountered. As a practical matter, of course, calcium oxide and fumed silica both tend to thicken the pour formulation and this decreases the rate at which capacitors can be filled, so one seeks optimum conditions which control the moisture problem while allowing rapid filling.

EXAMPLE 3

Further tests were then run to explore the more nominal 10% calcium oxide dosage with and without the addition of 3% of fumed silica as a dispersant to slow or prevent the settling of the calcium oxide. An asterisk denotes those groups in which 3% fumed silica was included. The values given below were after 500 hours of life test:

|  | Al/Cu | Zinc |
| --- | --- | --- |
| Canola Oil + 10% CaO* | −0.768 | −0.151 |
| Canola Oil + 10% CaO | −0.945 | −0.219 |
| Phthalate Ester + 10% CaO* | −0.852 | −0.109 |
| Phthalate Ester + 10% CaO | −1.027 | −0.069 |
| Epoxidized Linseed Oil + 10% CaO* | −0.824 | +0.041 |
| Epoxidized Linseed Oil + 10% CaO | −0.915 | −0.136 |

The values given above indicate a consistent advantage for the inclusion of fumed silica, but not enough to make it an absolute requirement. We also note that the inclusion of 0.5 wt % of an epoxide, sometimes used as a chloride scavenger, increases the efficiency of the fumed silica such that its amount can be reduced to 2 wt % without changing the settling rate seen at 3 wt % fumed silica without the epoxide. Fumed silica also helps to keep the CaO slurry from settling in mixing and dispensing equipment.

EXAMPLE 4

A final test group was prepared in order to compare the "worst case" performance of a nominal 10% calcium oxide addition to the nominal 5% isocyanate normally used in aluminum or aluminum alloy capacitors. The dielectric fluids were used (1) as-received (AR), with none of the vacuum degassing or adsorbent treatments normally employed to remove moisture and impurities and (2) water-saturated (WS), in which water was added to and shaken with the dielectric oil, then allowed to settle out and removed except for the water which had dissolved in the oil. Results after 500 hours on life test were:

| | Al/Cu |
|---|---|
| Phthalate Ester (WS) + 10% CaO* | −0.623 |
| Phthalate Ester (WS) + 5% Isocyanate | −6.659 |
| Phthalate Ester (AR) + 10% CaO* | −0.601 |
| Phthalate Ester (AR) + 5% Isocyanate | −3.500 |
| Canola Oil (WS) + 10% CaO* | −0.610 |
| Canola Oil (WS) + 5% Isocyanate | −5.097 |
| Canola Oil (AR) + 10% CaO* | −0.797 |
| Canola Oil (AR) + 5% Isocyanate | −1.928 |

The above figures indicate that, at these dosages, the calcium oxide is fully effective while the isocyanate is only marginally so. The asterisk again denotes the use of fumed silica. The calcium oxide dosage could be reduced, although there is no strong incentive to do so. The isocyanate dosage could be increased as high as 10%, but one wouldn't choose to do this simply to meet a worst case scenario.

Compared at equal amounts, calcium oxide should be able to react with at least 2.23 times as much water as diphenyl methane diisocyanate can.

Capacitors Containing A Gelled Dielectric

Figure 2:
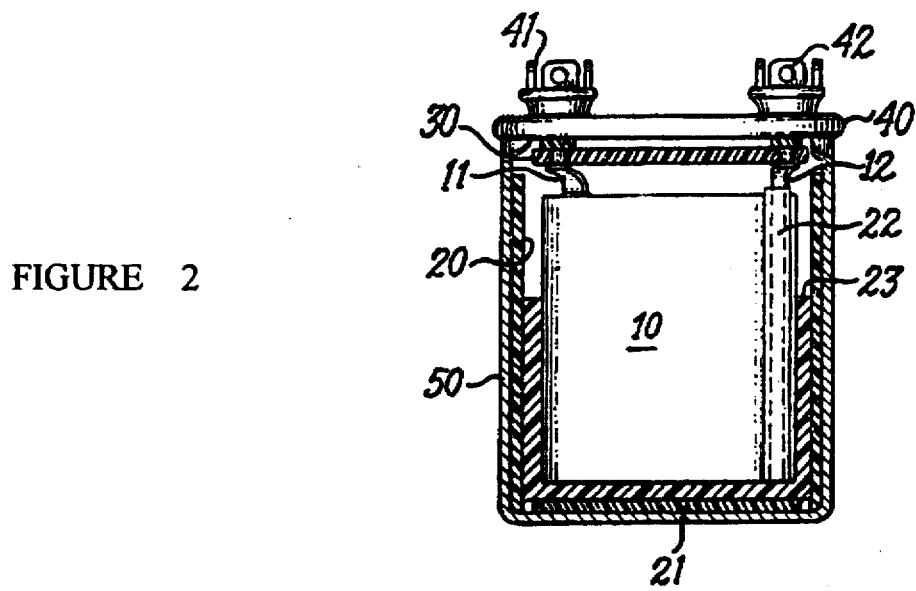
FIG. 2 depicts a typical encased capacitor employing the dielectric composition of this invention.

Life characteristics of AC metalized film capacitors have been found to be improved through use of a gelled dielectric fill coming calcium oxide. FIG. 2 shows an assembled capacitor wherein section 10 is insulated from the sides of the metal housing 50 by plastic insulating wrap 20 and from the bottom of metal housing 50 by plastic insulating disc 21. Tab 12 extends from the bottom of section 10 and is encased in plastic sheath or wrap 22 to insulate it from section 10.

Plasticized potting compound 23 containing calcium oxide fills most of the otherwise unoccupied space between section 10 and metal housing 50 and covers the top of section 10, but, preferably, leaves a void space above interrupter 30. This plasticized potting compound must be soft enough so that if there is a rapid pressure build-up, the pressure will build up uniformly throughout housing 50, and interrupter 30 will function to disconnect at least one of the electrode tabs 11, 12 from the bottom of at least one of the terminals 41, 42 which extend through cover 40 and interrupter 30 in a known manner.

If the potting material is not soft enough to allow gas to escape around it, e.g., between the potting material and the section and/or the plastic wrap, then a pocket of gas could be trapped by the potting compound, leading to rupture of the lower part of the can with the capacitor still connected to the circuit containing it.

While potting compound 23 must be deformable enough to allow any pressure buildup to be uniform, the potting compound 23 must be viscous enough so there will be no liquid leak or spill under rupture conditions. In other words, the capacitor performs as a dry unit.

The potting compound is prepared as a Part A and a Part B which are each relatively stable fluids, but which, when combined in suitable portions will react to form the desired gel. Examples of suitable components are as follows:

(1) An unsaturated liquid resin, such as:
Butadiene prepolymer such as Ricon 150
Dehydrated castor oil such as Castung 403-Z3
Hydroxyl-terminated butadiene such as those supplied by Elf Atochem (2) An unsaturated liquid cross-linker, such as:
Hexane Diol Di Acrylate
Penta Erythritol Tetra Acrylate
Trimethylol Propane Triacrylate (3) A dielectric liquid, such as:
Di Isononyl Phthalate
Canola Oil (4) Caldum Oxide (5) Peroxide, such as:
Methyl Ethyl Ketone Peroxide
Any other peroxide active at or below 80 C.

(6) Promoter, such as:
Cobalt Naphthenate or similar organo-cobalt promoter ("drier")
Any other promoter ("drier") able to activate cure below 80 C.

In evaluating the performance of such gel systems, 25-microfarad capacitors constructed with 6 micron (0.24 mil) metalized polypropylene film were used. This film is normally rated at 370 volts AC and life tested at higher voltages to accelerate destructive effects. All life tests were carded out at 492 volts, 60 Hz, 80 C. In such tests, cap loss tends to be greatest in the first few hundred hours as the most vulnerable areas of the capacitor metalizing are exposed to attack. The rate of capacitance change tapers off thereafter if an effective protective mechanism is operating. All test values shown are percent capacitance change from the original value.

Each of the following examples involves groups of metalized capacitors filled under identical conditions. Metalizing consists of an aluminum-copper alloy (Al/Cu), which is highly sensitive to moisture under AC service conditions, or zinc (Zn), which is sensitive to moisture during manufacture, but relatively immune to moisture-activated corrosion in AC service. Each individual test group consists of three units.

EXAMPLE 5

In early exploration of peroxide-cured systems, the gel mixtures listed below were tried both with and without 4 wt % Tertiary Butyl Peroctoate as the polymerization catalyst. No cobalt promoter was used and an 80 C. cure was necessary. Groups with the peroctoate are marked with an asterisk. (The magnesium oxide used had demonstrated some catalytic cure activity, while the calcium oxide tended to inhibit cure.) We later found the cobalt/MEK peroxide cure best suited to our needs, but the results nonetheless indicate the usefullness of calcium oxide as a moisture scavenger in such dielectric gels. Ricon 150 is abbreviated to Ricoh and Indopol H100 (a non-reactive polybutene fluid) is abbreviated to Indopol. The results given below are percent capacitance change after 500 hours:

| Dielectric Gel | Al/Cu | Zinc |
|---|---|---|
| 50 Ricon/50 Indopol | −3.347 | +0.040 |
| 50 Ricon/50 Indopol* | −5.098 | −0.235 |
| 50 Ricon/50 Indopol/10 MgO | −6.905 | +0.027 |
| 50 Ricon/50 Indopol/10 MgO* | −5.104 | +0.014 |
| 50 Ricon/50 Indopol/10 CaO | −0.842 | +0.054 |
| 50 Ricon/50 Indopol/10 CaO* | −0.985 | −0.027 |

EXAMPLE 6

Following many bench top tests on curing of dielectric gel mixtures, we have arrived at preferred mixtures which may be different for two different types of dielectric oil. The first type of dielectric oil includes those with little or no unsaturated hydrocarbon groups such as the phthalates (e.g.

diisononyl phthalate). These exhibit little or no interaction with the gelling chemistry. The second type of dielectric oil includes those with appreciable amounts of unsaturated hydrocarbon material, especially mono-unsaturates, which act as chain stoppers in the gel-forming polymerization chemistry. Many vegetable oils are of this sort, such as canola oil, which contains on the order of 60 wt % of mono-unsaturated molecules. Formulations capable of trapping the phthalates in a gel structure, may not be adequate to trap an equal quantity of vegetable oil. With the vegetable oils, a difunctional cross-linker tends to be inadequate and a tri-functional or tetra-functional cross-linker is preferred. Note that, where vegetable oils are concerned, some fraction of the vegetable oil will become chemically bonded to the gel structure.

For example, preferred gel formulations with the two types of oil may look like this:

(1) 70 parts diisononyl phthalate
   22.5 parts Castung 403 Z3
   7.5 parts hexane diol diacrylate
   0.1 parts cobalt naphthenate
   2.0 parts methyl ethyl ketone peroxide
   10.0 parts calcium oxide (2) 70 parts canola oil
   15 parts hydroxyl-terminated polybutadiene
   15 parts trimethylol propane triacrylate
   0.1 parts cobalt naphthenate
   2.0 parts methyl ethyl ketone peroxide
   10 parts calcium oxide In the above examples, if the phthalate oil were used in formulation (2), a satisfactory gel would result, but if canola oil were used in formulation (1), the gel would be inadequate.

It has been our experience in a wide variety of trials that the beneficial moisture-scavenging effect of the calcium oxide is obtained in all gel formulations tried. It should be noted that formulations (1) and (2) are simply two examples of the many formulations that are adequate and commercially feasible and that there is flexibility even in two such examples as (1) and (2). For instance, the amount of cobalt naphthenate or MEK peroxide in (1) or (2) could be cut in half and the mix would still gel, albeit more slowly. Or, in formulation (2), 30 parts of trimethylol propane triacrylate could be substituted for the 15 parts of hydroxyl-terminated butadiene plus 15 parts of trimethylol propane triacrylate and the mix would still gel adequately.

In commercial use, one might make up, for instance, a one-week supply of a gel formulation containing everything except the cobalt (or other promoter) and MEK peroxide. This is relatively stable and might exhibit nothing more than a slow rise in viscosity over a period of a month or two. Part of this master batch could then be split into a Part A and a Part B which might represent a one-day supply. The cobalt needed for the quantity comprising the combined parts would be added to one part and the MEK peroxide needed for the quantity comprising the combined parts would be added to the other part. One or both of these parts may exhibit a viscosity rise with time, but the relatively fast gel reaction that is desired starts at the mixer-dispenser filling the capacitors with the combined Parts A & B. The mixed material will gel at room temperature or the gelling can be accelerated by heating. The gel reaction evolves heat, but the unreactive or relatively unreactive oil present does greatly attenuate the temperature rise that could otherwise occur.

In one test in which all of the capacitors were from one lot, using 6-micron thick polypropylene metalized with an aluminum/copper alloy, filled as 3-piece groups with formulations (1) and (2), and life-tested together, the average percentage capacitance losses were as shown below. The variations on formulation (2) consisted of use of canola oil from two different sources, Chemol Co., and Archer-Daniels-Midland (ADM) and use of two grades of hydroxy-terminated butadiene, trademarked as Poly BD R20LM and Poly BD R45HT. The average capacitance loss percentages are shown after 257 hours on test and after 542 hours on test:

|  | 257 Hrs | 542 Hrs |
|---|---|---|
| Formulation (1) | −1.31 | −1.64 |
| Formulation (2) with Chemol & R20LM | −1.24 | −1.38 |
| Formulation (2) with Chemol & R45HT | −0.25 | −0.30 |
| Formulation (2) with ADM & R20LM | −1.10 | −1.23 |
| Formulation (2) with ADM & R45HT | −1.69 | −1.89 |

Note that the capacitance loss at 257 hours is small and increases quite slowly (0.33% to 0.05%) in the next 285 hours on test.

What is claimed is:

1. A film capacitor comprising wound dielectric films having metalized surfaces, said wound films enclosed in a case, said case containing dielectric material surrounding said wound films, said material containing 1 to 50 weight percent of calcium oxide.

2. The film capacitor of claim 1 wherein said films are polypropylene film, said metalized surfaces are selected from the group consisting of aluminum, aluminum alloy, and zinc.

3. The film capacitor of claim 2 wherein said dielectric material is selected from the group consisting of phthalate ester, canola oil, rapeseed oil, and epoxidized linseed oil; and said calcium oxide is present from 10 to 20 weight percent.

4. The film capacitor of claim 3 wherein said dielectric material contains a potting compound including prepolymers and crosslinkers.

5. The film capacitor of claim 4 wherein said prepolymer is selected from the group consisting of dehydrated castor oil, butadiene prepolymers, and hydroxy-terminated butadiene prepolymers; and said crosslinker is selected from the group consisting of hexane diol diacrylate, and trimethylol propane triacrylate.

* * * * *